United States Patent [19]

Brown

[11] Patent Number: 4,927,894

[45] Date of Patent: May 22, 1990

[54] METHOD FOR PREPARATION OF ARYLOXYTRIAZINE-CAPPED POLYPHENYLENE ETHERS

[75] Inventor: Sterling B. Brown, Schenectady, N.Y.

[73] Assignee: General Electric Company, Schenectady, N.Y.

[21] Appl. No.: 369,153

[22] Filed: Jun. 21, 1989

[51] Int. Cl.⁵ .................. C08G 30/08; C08G 65/48
[52] U.S. Cl. .................................. 525/390; 528/216
[58] Field of Search ............... 525/390; 528/215, 216

[56] References Cited

U.S. PATENT DOCUMENTS 3,459,713  8/1969  Saran .................................. 525/390

Primary Examiner—Harold D. Anderson
Attorney, Agent, or Firm—William H. Pittman; James C. Davis, Jr.

[57] ABSTRACT

Aryloxytriazine-capped polyphenylene ethers are prepared by reaction of a polyphenylene ether with an aryl cyanurate. The products undergo reaction with amine-terminated polymers such as polyamides, to form compositions which have excellent properties and which find utility as molding compositions and as compatibilizers for blends of similar polymers.

11 Claims, No Drawings

METHOD FOR PREPARATION OF ARYLOXYTRIAZINE-CAPPED POLYPHENYLENE ETHERS

This invention relates to the preparation of aryloxytriazine-capped polyphenylene ethers.

The polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

A disadvantage of the polyphenylene ethers which militates against their use for molding such items as automotive parts is their low resistance to non-polar solvents such as gasoline. For increased solvent resistance, it would be desirable to form compositions in which polyphenylene ethers are combined with resins which have a high degree of crystallinity and therefore are highly resistant to solvents. Illustrative of such resins are the thermoplastic polyamides. Other reasons exist for forming compositions comprising polyphenylene ethers and such other polyamides as the amorphous and elastomeric species.

However, polyphenylene ether-polyamide blends frequently undergo phase separation and delamination. They typically contain large, incompletely dispersed polyphenylene ether particles and no phase interaction between the two resin phases. Molded parts made from such blends are typically characterized by extremely low impact strength, brittleness, delamination and the like.

Numerous methods for compatibilizing polyphenylene ether-polyamide compositions have been developed. For example, U.S. Pat. No. 4,315,086 and copending, commonly owned application Ser. No. 736,489, filed May 20, 1985, and corresponding published PCT application No. 85/5372, describe the use for this purpose of various polyfunctional compounds, including olefinic and acetylenic carboxylic acids, polycarboxylic acids and functional derivatives thereof.

A very effective way of compatibilizing polyphenylene ether-polyamide compositions is by the formation of a copolymer of the two resins. This may be achieved by the incorporation of a polyamide-reactive functional group on the polyphenylene ether. Groups suitable for this purpose include carboxylic acid groups as in U.S. Pat. Nos. 4,600,741 and 4,732,938 and copending, commonly owned application Ser. No. 314,866, filed Feb. 24, 1989, now U.S. Pat. No. 4,888,397.

Another particularly suitable polyamide-reactive functional group is the epoxy group. Various methods of attaching epoxy groups to polyphenylene ethers have been disclosed. For example, U.S. Pat. No. 4,460,743 describes the reaction of a polyphenylene ether with epichlorohydrin; U.S. Pat. No. 4,732,937 the reaction with terephthaloyl chloride and glycidol; copending, commonly owned application Ser. No. 912,705, filed Sept. 29, 1986, the reaction with various epoxy-functionalized ethylenic monomers such as glycidyl acrylate, glycidyl methacrylate and allyl glycidyl ether in the presence of free radical initiators; and application Ser. No. 286,184, filed Dec. 19, 1988, the reaction with an epoxychlorotriazine.

Copending, commonly owned application Ser. No. 319,393, filed March 6, 1989, discloses and claims aryloxytriazine-capped polyphenylene ethers and a method for their preparation by the reaction of a polyphenylene ether with an aryloxychlorotriazine. Said capped polyphenylene ethers undergo reaction with polyamides to form copolymers, apparently by displacement of an aryloxy group by an amine end group in the polyamide.

Despite the advantages of aryloxytriazine-capped polyphenylene ethers for this purpose, some problems are encountered. In the first place, aryloxychlorotriazines are not readily available in commercially useful quantities at a reasonable price. In the second place, their reaction with polyphenylene ethers generates chloride ions which may cause corrosion of metallic processing equipment. There is interest in developing an alternative method for preparing such capped polyphenylene ethers which is free from these problems.

The present invention provides such a method. It involves the use of readily available or simply prepared reagents, and the reaction which takes place affords no by-products capable of causing appreciable damage to processing equipment of the type ordinarily used.

Accordingly, the present invention is a method for preparing an aryloxytriazine-capped polyphenylene ether composition which comprises contacting under reactive conditions, in the presence of a basic reagent, at least one polyphenylene ether with an aryl cyanurate of the formula

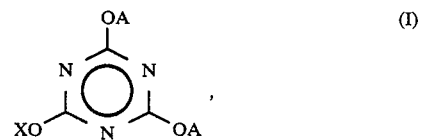

wherein A is an unsubstituted or substituted aromatic radical and X is an alkyl or cycloalkyl or an unsubstituted or substituted aromatic radical.

The polyphenylene ethers (also known as polyphenylene oxides) useful in the method of this invention encompass numerous variations and modifications all of which are applicable to the present invention, including but not limited to those described hereinafter. They comprise a plurality of structural units having the formula

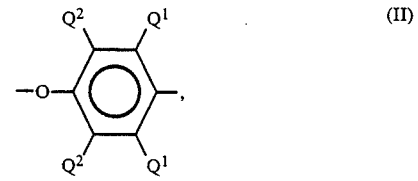

and in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-di-methylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ are methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

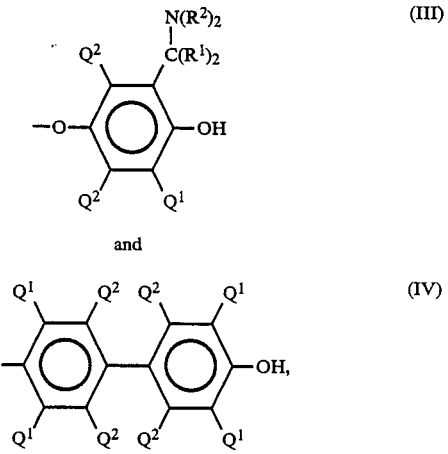

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

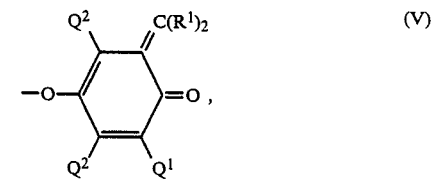

with numerous beneficial effects often including an increase in impact strength and compatibilization with other blend components. Reference is made to U.S. Pat.

Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

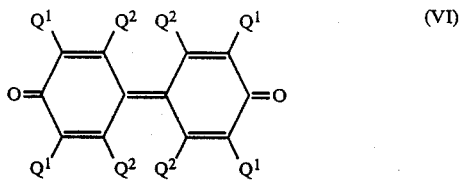

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups, provided a substantial proportion of free hydroxy groups is present.

It will be apparent to those skilled in the art from the foregoing that the polyphenylene ethers contemplated for use in the present invention include all those presently known, irrespective of variations in structural units or ancillary chemical features.

According to the present invention, the polyphenylene ether is caused to react with an aryl cyanurate of formula I. The X value therein may be an alkyl or cycloalkyl radical, typically lower alkyl, or an aromatic radical, typically containing 6-10 carbon atoms and especially an aromatic hydrocarbon radical; and A is an identical aromatic radical or a different radical of the same type.

When X is an alkyl or cycloalkyl radical, it is often preferably sterically hindered to prevent nucleophilic attack on said radical during copolymer formation by an amino nitrogen atom of a polyamide, to form an alkylated amine group. Sterically hindered radicals include secondary and tertiary radicals, as well as primary alkyl radicals which are highly branched on atoms close to the 1-carbon atom; e.g., neoalkyl.

Most often, both A and X are phenyl or are substituted phenyl; thus, the preferred aryl cyanurate is triphenyl cyanurate. Substituted phenyl groups in which the substituents have several identical hydrogen atoms, such as t-butylphenyl and methoxyphenyl, may have the advantage of affording products in which the proportion of capping may be determined by proton nuclear magnetic resonance, utilizing the protons on the t-butyl or methoxy group. (The same is true when X is methyl or t-butyl.) On the other hand, electron-withdrawing substituents such as halo, carboxy, carbalkoxy, nitrile, nitro, acyl and aldehyde groups may promote displacement by the amine groups in a polyamide by reason of the lower pKa of the conjugate acid of the displaced aryloxide anion.

According to the invention, the reaction between the polyphenylene ether and the aryl cyanurate may be conducted interfacially in a medium comprising water and a non-polar organic liquid, preferably an aromatic hydrocarbon such as toluene or xylene. The basic reagent is usually a water-soluble base, typically an alkali metal hydroxide and preferably sodium hydroxide. It may be added to the mixture of aryl cyanurate and polyphenylene ether, or may initially react with the polyphenylene ether to form a salt which is then contacted with the aryl cyanurate.

There is also employed a phase transfer catalyst. Any of such catalysts which are stable and effective under the prevailing reaction conditions may be used; those skilled in the art will readily perceive which ones are suitable. Particularly preferred are tetraalkylammonium chlorides wherein at least two alkyl groups per molecule, typically 2 or 3, contain about 5-15 carbon atoms.

Reaction temperatures in the range of about 20°-90° C. may be employed. The amount of aryl cyanurate is typically in the range of about 1-6% and preferably about 2-6% by weight based on polyphenylene ether. Most often, the ratio of equivalents of base to moles of aryl cyanurate is about 1.0-1.5:1, and the weight ratio of phase transfer catalyst to polyphenylene ether is about 0.01-5.0:1. It is frequently preferred to neutralize the reaction mixture with any convenient acidic compound; carbon dioxide, in gaseous, liquid or solid form, is generally suitable.

The products obtained by the method of this invention are believed to be identical in structure to those obtained by the reaction of aryloxychlorotriazines with polyphenylene ethers, as disclosed in the aforementioned copending application Ser. No. 319,393. They are apparently obtained in the present instance by displacement of the aryloxy group by the end group of the polyphenylene ether. Like the products prepared according to said copending application, those obtained by the method of this invention form compatible, ductile compositions with amine-terminated polymers, especially polyamides.

The invention is illustrated by the following examples.

EXAMPLE 1

A solution of 400 grams of a poly(2,6-dimethyl-1,4-phenylene ether) having an intrinsic viscosity in chloroform at 25° C. of 0.40 dl./g. in 2,500 ml. of toluene was stirred at 25°-40° C., and there were added 48 grams of a 10% solution in toluene of a commercially available methyltrialkylammonium chloride in which the alkyl groups contained 8-10 carbon atoms and 14 grams (39 mmol.) of triphenyl cyanurate as a slurry in about 150 ml. of methylene chloride. The solution was vigorously stirred as 24 grams of 10% aqueous sodium hydroxide solution was added dropwise over 5 minutes, and stirring was continued for 100 minutes. The mixture was neutralized by bubbling in gaseous carbon dioxide, and the product was precipitated by treatment with methanol in a blender, filtered, washed well with methanol and dried in a vacuum oven at 90°-110° C. It had an intrinsic viscosity of 0.49 dl./g., and was shown by Fourier transform infrared spectroscopy to have no free hydroxy end groups.

EXAMPLE 2

The procedure of Example 1 was repeated, substituting 16 grams (30 mmol.) of tris(4-t-butylphenyl) cyanurate for the triphenyl cyanurate. The product contained 0.04% free hydroxy end groups, as compared to 0.09% for the starting polyphenylene ether. Proton nuclear magnetic resonance spectroscopy showed a prominent peak attributable to the t-butyl groups. A comparison of the area under that peak to the area under the polyphenylene ether aryl peak showed that 1.9% of the cyanurate had reacted to cap the polyphenylene ether.

What is claimed is:

1. A method for preparing an aryloxytriazine-capped polyphenylene ether composition which comprises contacting under reactive conditions, in the presence of a basic reagent, at least one polyphenylene ether with an aryl cyanurate of the formula

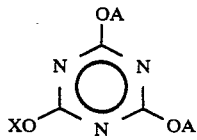
(I)

wherein A is an unsubstituted or substituted aromatic radical and X is an alkyl or cycloalkyl or an unsubstituted or substituted aromatic radical.

2. A method according to claim 1 wherein the polyphenylene ether comprises a plurality of structural units having the formula

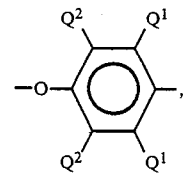
(II)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein X is aromatic.

4. A method according to claim 3 wherein the polyphenylene ether is a poly(2,6-dimethyl-1,4-phenylene ether).

5. A method according to claim 4 wherein the reaction is conducted interfacially at a temperature in the range of about 20°–90° C. in a medium comprising water and a non-polar organic liquid, the basic reagent is a water-soluble base, and a phase transfer catalyst is also employed.

6. A method according to claim 5 wherein the basic reagent is sodium hydroxide, the organic liquid is toluene and the phase transfer catalyst is a tetraalkylammonium chloride wherein at least two alkyl groups per molecule contain about 5–15 carbon atoms.

7. A method according to claim 6 wherein the amount of aryl cyanurate is in the range of about 1–6% by weight, based on polyphenylene ether; the ratio of equivalents of base to moles of aryl cyanurate is about 1.0–1.5:1; and the weight ratio of phase transfer catalyst to polyphenylene ether is about 0.01–5.0:1.

8. A method according to claim 7 wherein both A and X are phenyl or substituted phenyl.

9. A method according to claim 8 wherein both A and X are unsubstituted phenyl.

10. A method according to claim 7 wherein the reaction mixture is subsequently neutralized with an acidic compound.

11. A method according to claim 10 wherein the acidic compound is carbon dioxide.

* * * * *